United States Patent
Zhou et al.

(10) Patent No.: US 11,790,865 B1
(45) Date of Patent: Oct. 17, 2023

(54) IMAGE PROCESSING METHOD, STORAGE MEDIUM, AND DISPLAY DEVICE

(71) Applicant: HKC Corporation Limited, Guangdong (CN)

(72) Inventors: Mancheng Zhou, Guangdong (CN); Zhi Xiong, Guangdong (CN); Baohong Kang, Guangdong (CN)

(73) Assignee: HKC CORPORATION LIMITED, Guangdong (CN)

( * ) Notice: Subject to any disclaimer, the term of this patent is extended or adjusted under 35 U.S.C. 154(b) by 0 days.

(21) Appl. No.: 18/216,279

(22) Filed: Jun. 29, 2023

(30) Foreign Application Priority Data

Nov. 9, 2022 (CN) .......................... 202211398524.1

(51) Int. Cl.
*G09G 3/36* (2006.01)
*G06V 10/75* (2022.01)

(52) U.S. Cl.
CPC ......... *G09G 3/3614* (2013.01); *G06V 10/751* (2022.01); *G09G 2310/0254* (2013.01)

(58) Field of Classification Search
CPC ......... G09G 3/3614; G09G 2310/0254; G06V 10/751
See application file for complete search history.

(56) References Cited

U.S. PATENT DOCUMENTS

2018/0182305 A1* 6/2018 Zhang ................... G09G 3/3648

FOREIGN PATENT DOCUMENTS

| CN | 101577091 A | 11/2009 |
| CN | 107657932 A | 2/2018 |
| CN | 109192158 A | 1/2019 |
| CN | 109739461 A | 5/2019 |
| CN | 114863861 A | 8/2022 |

OTHER PUBLICATIONS

Chinese First Office Action dated Jan. 13, 2023 issued in CN 202211398524.1.

* cited by examiner

*Primary Examiner* — Abhishek Sarma
(74) *Attorney, Agent, or Firm* — Scully, Scott, Murphy & Presser, P.C.

(57) ABSTRACT

An image processing method and apparatus, a storage medium, and a display device are provided in the present disclosure. The image processing method is used for image processing on the display device. The method includes the following. Target image data is received. Picture detection is performed on the target image data. Polarity adjustment is executed on a signal transmission line of the display device when the target image data satisfies a first grayscale-condition and/or a first area-condition. Exit polarity adjustment when the target image data satisfies a second grayscale-condition or a second area-condition, where a condition range in which the second grayscale-condition is satisfied is less than a condition range in which the first grayscale-condition is not satisfied, and a range in which the second area-condition is satisfied is less than a range in which the first area-condition is not satisfied. A non-transitory computer-readable storage medium and a display device are provided.

18 Claims, 11 Drawing Sheets

200

400

DETERMINE WHETHER A RATIO OF AN AREA OF REPEAT UNITS IN THE TARGET IMAGE DATA TO AN ENTIRE DETECTION AREA IS LESS THAN OR EQUAL TO A SECOND PRESET RATIO, WHERE THE SECOND PRESET RATIO IS A DIFFERENCE BETWEEN A FIRST PRESET RATIO AND A THIRD ADJUSTMENT VALUE, AND THE FIRST AREA-CONDITION COMPRISES WHETHER THE RATIO OF THE AREA OF THE REPEAT UNITS IN THE TARGET IMAGE DATA TO THE ENTIRE DETECTION AREA IS GREATER THAN OR EQUAL TO THE FIRST PRESET RATIO ~ 410b

EXIT POLARITY ADJUSTMENT WHEN THE RATIO OF THE AREA OF THE REPEAT UNITS IN THE TARGET IMAGE DATA TO THE ENTIRE DETECTION AREA IS LESS THAN OR EQUAL TO THE SECOND PRESET RATIO ~ 420b

OUTPUT A FIRST CONTROL SIGNAL, A SECOND CONTROL SIGNAL, AND A THIRD CONTROL SIGNAL ~ 340

CHANGE A POTENTIAL OF ANY ONE OF THE FIRST CONTROL SIGNAL, THE SECOND CONTROL SIGNAL, OR THE THIRD CONTROL SIGNAL, TO MAKE AN ABNORMAL PARAMETER OF THE TARGET IMAGE DATA SUBJECT TO POLARITY ADJUSTMENT IS IN A PRESET SPECIFICATION ~ 350

FIG. 15

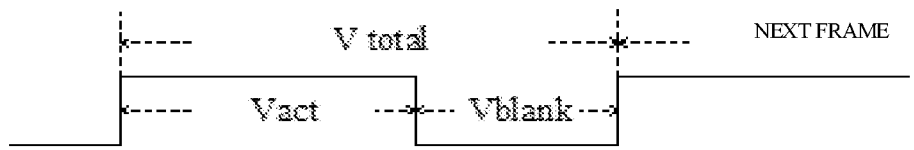

FIG. 16

| DOT_C | POL | POLC | Y1 | Y2 | Y3 | Y4 | Y5 | Y6 |
|---|---|---|---|---|---|---|---|---|
| L | L | L | + | - | + | - | + | - |
|   | L | H | - | + | - | + | - | + |
|   | H | L | - | + | - | + | - | + |
|   | H | H | + | - | + | - | + | - |
| H | L | L | + | - | - | + | + | - |
|   | L | H | - | + | + | - | - | + |
|   | H | L | - | + | + | - | - | + |
|   | H | H | + | - | - | + | + | - |

IMAGE PROCESSING METHOD, STORAGE MEDIUM, AND DISPLAY DEVICE

CROSS-REFERENCE TO RELATED APPLICATIONS

This application claims priority under 35 U.S.C. § 119(a) to Chinese Patent Application No. 202211398524.1, filed Nov. 9, 2022, the entire disclosure of which is incorporated herein by reference.

TECHNICAL FIELD

This disclosure relates to the field of display technology, and in particular, to an image processing method, a non-transitory computer-readable storage medium, and a display device.

BACKGROUND

Compared with a conventional cathode-ray-tube (CRT) display and a plasma display, a liquid crystal display (LCD) television has a great advantage in power-saving. A LCD display only has half of power consumption of the CRT display with the same size, and power consumption of the LCD display is much lower than the plasma display. Compared with the conventional CRT display, the LCD display also has an advantage in environmental protection due to the lack of high-voltage components such as a CRT inside the LCD display, and thus excessive radiation ray caused by high voltage is avoided. A display region of the LCD display has virtually no radiation, and only has a small amount of electromagnetic waves from a drive circuit. As long as a housing is tightly sealed, electro-magnetic susceptibility (EMI) can be reduced, making a radiation index of the LCD display generally lower than that of the CRT display. The LCD display has a large visible region, and the LCD display displays by controlling the state of liquid crystal molecules through electrodes in a display screen. Even if the screen is enlarged, the volume of the LCD display will not increase proportionally (only the size increases but not the thickness, so that more products provide a wall-hanging function, which saves more space for the user). In addition, the LCD display is much lighter than conventional displays with the same display area, the LCD television has approximately ⅓ the weight of a conventional television, and thus the LCD display is also known as a cold display or an environmentally-friendly display.

Therefore, how to ameliorate crosstalk and other abnormalities in a display picture and improve the picture display quality has been a technical problem to be solved.

SUMMARY

In a first aspect, an image processing method for image processing on a display device is provided in the disclosure. The method includes the following. Target image data is received. Picture detection is performed on the target image data. Polarity adjustment is executed on a signal transmission line of the display device when the target image data satisfies a first grayscale-condition and/or a first area-condition. Exit polarity adjustment when the target image data satisfies a second grayscale-condition or a second area-condition, where a condition range in which the second grayscale-condition is satisfied is less than a condition range in which the first grayscale-condition is not satisfied, and a range in which the second area-condition is satisfied is less than a range in which the first area-condition is not satisfied.

In a second aspect, a storage medium is further provided in the disclosure. The storage medium stores a computer program, where the computer program, when executed by a processor, is configured to implement the method in the first aspect.

In a third aspect, a display device is further provided in the disclosure. The display device includes at least a memory and a processor, where the memory stores a computer program, and the processor is configured to implement the method in the first aspect when executing the computer program in the memory.

BRIEF DESCRIPTION OF THE DRAWINGS

To explain technical solutions in implementations of the present disclosure more clearly, the following will give a brief introduction to accompanying drawings which are needed to be used in description of implementations.

FIG. 14 is a schematic flowchart of operations at 400 in FIG. 6 provided in an implementation.

FIG. 15 is a schematic flowchart of operations at 300 in FIG. 6.

FIG. 16 is a schematic diagram of a vertical active area and a vertical blank area in a frame.

DETAILED DESCRIPTION

The following clearly and completely describes the technical solutions in the implementations of the present disclosure with reference to the accompanying drawings in the implementations of the present disclosure. Apparently, the described implementations are merely a part rather than all of the implementations of the present disclosure. Furthermore, references in this application to "an implementation" or "an implementation" mean that a particular feature, structure, or characteristic described in connection with the implementation or implementation can be included in at least one implementation of the present disclosure. The appearances of this phrase in various places in the description are not necessarily all referring to the same implementation, nor are separate or alternative implementations mutually exclusive of other implementations. It will be apparent to those skilled in the art that the implementations described herein can be combined with other implementations.

Figure 1:
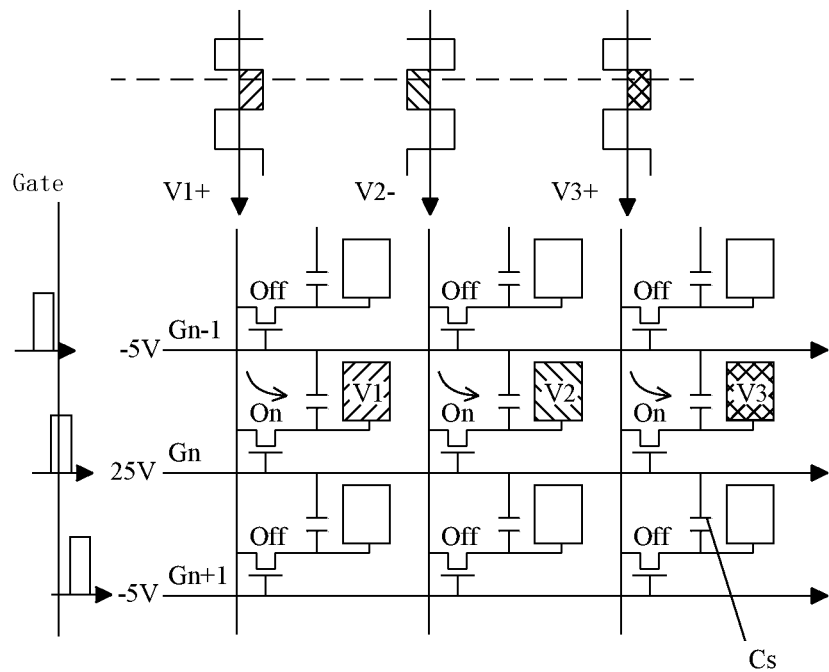
FIG. 1 is a schematic structural diagram of a driving circuit of a display device provided in an implementation of the present disclosure.
Figure 2:
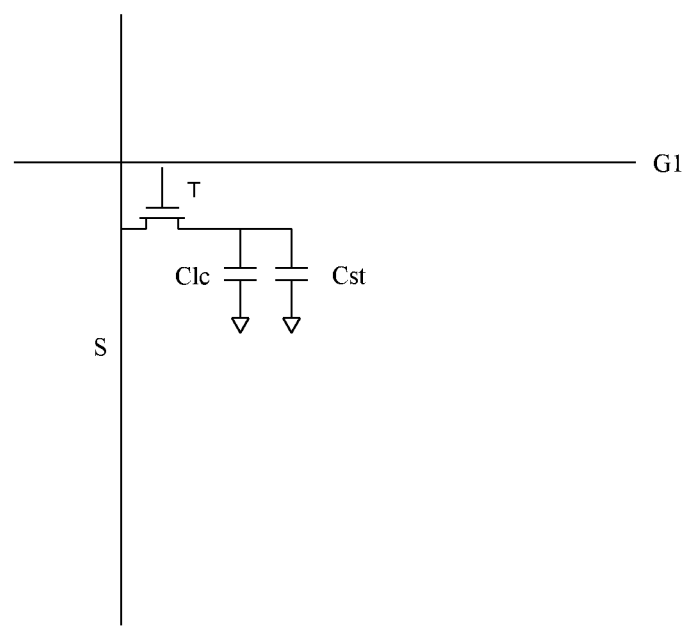
FIG. 2 is a simplified schematic diagram of a sub-pixel in the driving circuit in FIG. 1.
Figure 3:
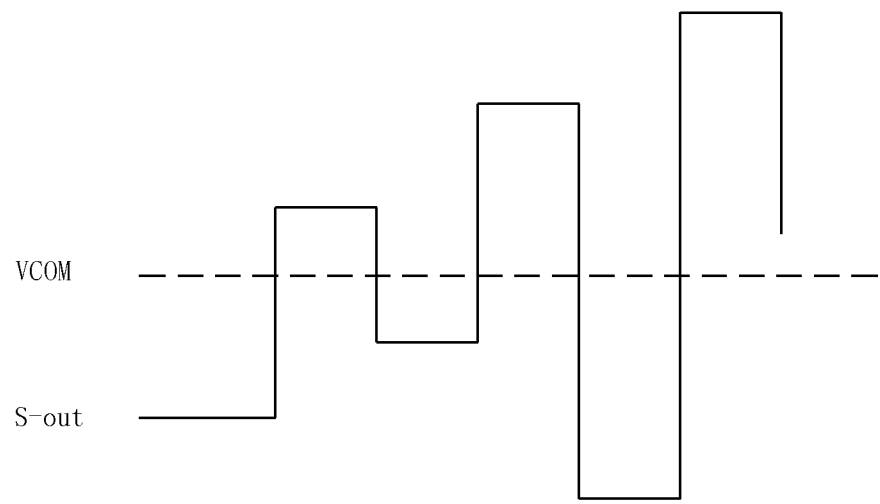
FIG. 3 is a schematic waveform diagram of output data S-out of the driving circuit in FIG. 1.
Figure 4:
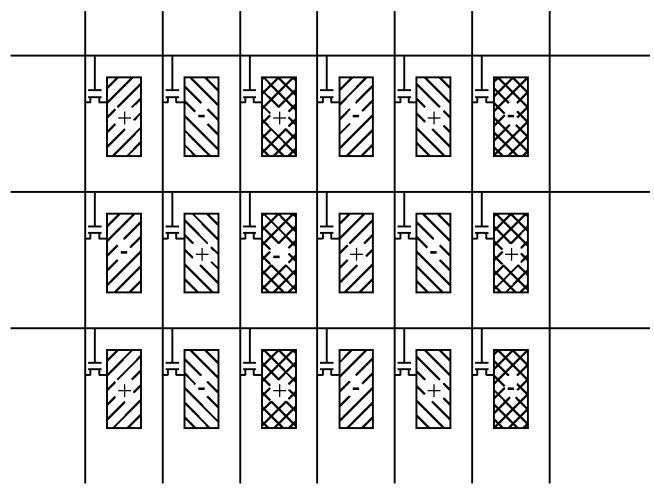
FIG. 4 is a dot inversion mode corresponding to a full image.
Figure 5:
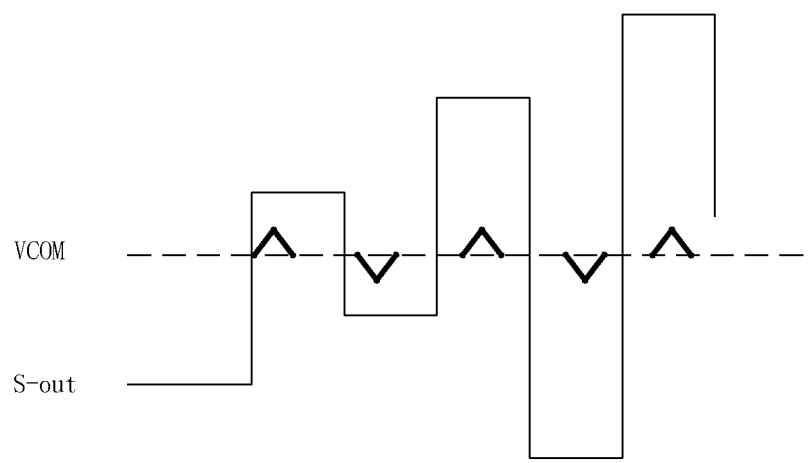
FIG. 5 is a schematic diagram of a voltage fluctuation appearing of a common voltage VCOM interfered by a data line.

Currently, a liquid crystal display (LCD) develops to a higher resolution, a higher display quality, and a larger size. A thin film transistor liquid crystal display (TFT-LCD) can be driven line-by-line. Specifically, as illustrated in FIG. 1, when signal Gn on a gate line is high, a thin film transistor (TFT) in a current row is turned on, and data in a column direction can be written into a pixel. A simplified schematic diagram of each sub-pixel may be as illustrated in FIG. 2, where T represents a control switch, Clc represents a liquid crystal capacitor, Cst represents a storage capacitor, G line is responsible for transmitting a switch signal, and S line is responsible for transmitting a data voltage (i.e., data), and one end of each of Cst and Clc is a pixel electrode and the other end of each of Cst and Clc is a common electrode (VCOM). Since liquid crystal charging/discharging is a capacitor architecture, if the capacitor architecture is driven, then residual electric charges will be generated at both ends of the capacitors, which will result in an afterimage on a display. In order to avoid this phenomenon, a direct current (DC) circuit is changed into an alternating current (AC) circuit, and liquid crystal operates by different rotation and different transmittance with different voltages at both ends. FIG. 3 is a schematic waveform diagram of data S-out. FIG. 4 illustrates one polarity inversion mode (dot inversion) corresponding to a full image, "±" represents a voltage higher or lower than the VCOM, i. e. "+" represents a voltage higher than the VCOM, and "−" represents a voltage lower than the VCOM. As illustrated in FIG. 5, the common voltage VCOM is easily interfered by the data line. Compared with FIG. 3, a voltage fluctuation occurs to the VCOM, which may cause an abnormality such as crosstalk in a display picture.

A display device is provided in the present disclosure, for ameliorating crosstalk and other abnormalities in a display picture and improving the picture display quality. As can be appreciated, the display device can be any device that displays any of motion (e. g., video), stationary (e. g., still images), text, or images. More particularly, the display device may be one of a variety of electronic devices, including but not limited to televisions, mobile phones, wireless devices, personal data assistants (PDAs), hand-held or portable computers, global positioning system (GPS) receivers/navigators, cameras, MP4 video players, video cameras, gaming consoles, wrist watches, clocks, calculators, television monitors, flat panel displays, computer monitors, auto displays (e. g., an odometer, etc.), navigators, cockpit controllers and/or cockpit displays, camera view display (e. g., display of a rear view camera in a vehicle), electronic photographs, electronic billboards or signs, projector, etc. The specific form of the display device is not limited in implementations of the present disclosure. In present implementations, the display device is the LCD.

Figure 6:
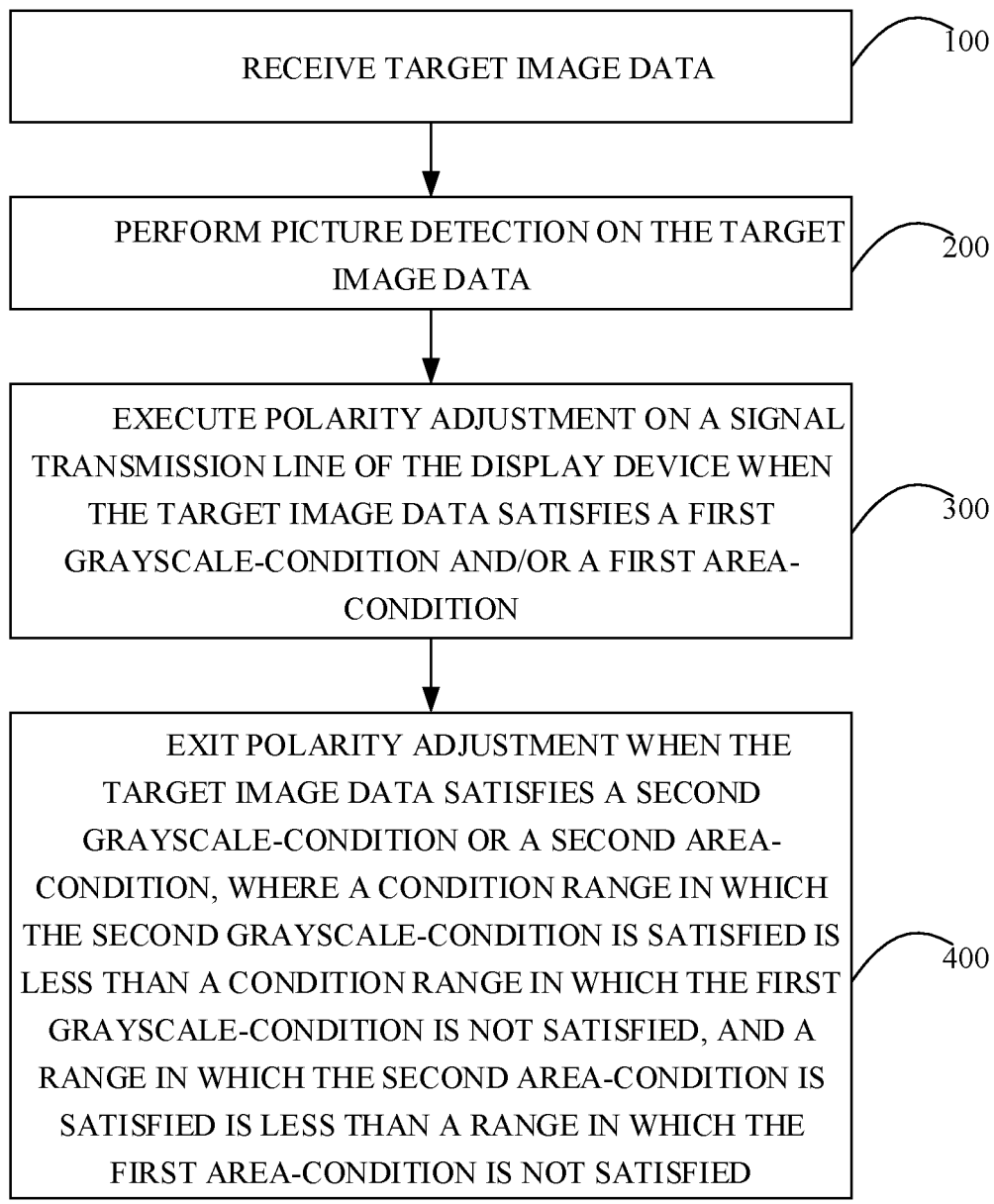
FIG. 6 is a schematic flowchart of an image processing method provided in an implementation of the present disclosure.

Please refer to FIG. 6, an image processing method is provided in the present disclosure, and the method is used for image processing on a display device. The image processing method at least includes the following.

At 100, target image data is received.

Figure 7:
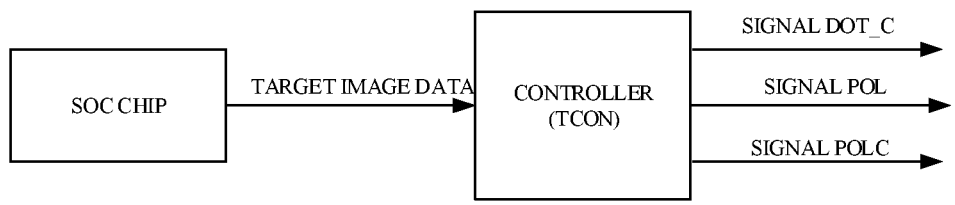
FIG. 7 is a signal flow diagram of a controller in an image processing method provided in the present disclosure.

Please refer to FIG. 7, in a signal receiving stage, a controller (e.g., timing controller (TCON)) receives the target image data from a front-end chip, where the front-end chip includes, but is not limited to, a main board chip or a system-on-chip (SOC) chip. The target image data is a digital signal used for forming a picture. The TCON is a main control chip of a LCD panel, and is configured to change an image data signal received into a synchronous row control signal and a data output signal, etc., so as to achieve image display on the LCD panel.

The target image data includes image information about multiple frames of pictures, and in one frame of picture, the target image data at least includes a greyscale of each sub-pixel, etc.

At 200, picture detection is performed on the target image data.

In a picture detection stage, the controller automatically performs picture detection on the target image data received.

Performing picture detection on the target image data refers to detecting partial or entire regions in a frame of a picture. In this implementation, part of a frame of a picture is detected, and a region detected is referred to as a detection region.

The controller (TCON) stores multiple preset template data, the preset template data has a certain degree of logic, and for example, the preset template data contains a black block on a white background, or sub-pixels composed of alternating bright and dark sub-pixels.

Picture detection is performed as follows. Compare the target image data received with multiple preset template data. Detect whether the target image data is the same as one of the multiple preset template data in logic. If the target image data is the same as one of the multiple preset template data in logic, continue to compare at least one of a greyscale of the target image data or an area of repeat units in a detection region in a frame with a preset threshold. Detection of greyscale of a sub-pixel is to directly compare the greyscale of the sub-pixel with a preset threshold. For example, there are two greyscales in the detection region, one is a relatively large greyscale, so that a sub-pixel unit is in a bright state, and the other kind is a relatively small greyscale, so that a sub-pixel unit is in a dark state. The relatively large greyscale is compared with a relatively large greyscale threshold, and the relatively small greyscale is compared with a relatively small greyscale threshold. Optionally, the detection region includes multiple repeat units arranged at regular intervals, and an abnormal display region in the detection region does not conform to the above arrangement rule. The ratio of the area of the repeat units to the entire detection area is compared with a preset area threshold.

At 300, when the target image data satisfies a first grayscale-condition and/or a first area-condition, execute polarity adjustment on a signal transmission line of the display device.

When a picture that satisfies the first grayscale-condition and/or the first area-condition is detected, enter a picture-detection-function (PDF) execution stage to enable the TCON to output a control signal according to a setting, so as to adjust the polarity of the signal transmission line of the display device. The signal transmission line includes, but is not limited to, a signal transmission line coupled with the VCOM to cause a voltage fluctuation on the VCOM. In this implementation, the signal transmission line is a data line.

Since the VCOM is easily interfered by coupling of the data line, when the display screen is displaying, all data lines with positive or negative polarity affect the VCOM. If all data lines as a whole is presented as +, the VCOM voltage fluctuates upward, if all data lines as a whole is presented as −, the VCOM voltage fluctuates downward, and crosstalk, greenish or other abnormalities will occur to a display picture. The crosstalk refers to a distortion of a picture caused by a situation in which there is a block of another color on a solid-color background and the brightness of regions adjacent to the block changes.

In order to solve the described problem, by introducing the PDF in some pictures where crosstalk or greenish is prone to occur, the TCON is enabled to output a control signal according to a setting, where the control signal includes but is not limited to signal DOT_C, signal POLC, and signal POL, so as to change the polarity of the data line, thereby ameliorating the abnormality such as crosstalk and greenish.

For example, the first grayscale-condition includes but is not limited to that the relatively large grayscale of the sub-pixel in the detection region is greater than or equal to a relatively large grayscale, and the relatively small grayscale of the sub-pixel in the detection region is less than or equal to a relatively small grayscale, so as to obtain an image satisfying the first grayscale-condition.

For example, the first area-condition includes but is not limited to that the ratio of the area of the repeat units in the detection area to the entire detection area is greater than or equal to a first preset ratio, so as to obtain an image satisfying the first area-condition. The repeat units include but are not limited to, one bright sub-pixel and one dark sub-pixel. The controller TCON periodically detects the entire detection region by following a cycle of one bright sub-pixel, one dark sub-pixel, and so on.

Figure 8:
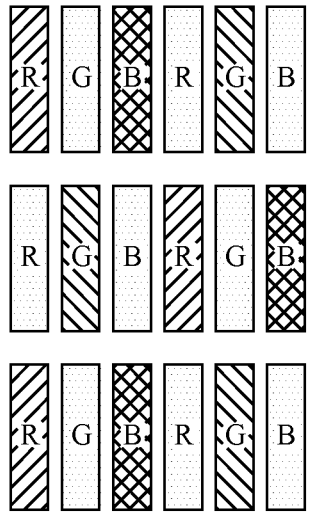
FIG. 8 is a schematic diagram of a pixel matrix of a display device provided in an implementation of the present disclosure.

Please refer to FIG. 8, optionally, the repeat units include, but are not limited to, one pixel with R and B being bright and G being dark, and an adjacent pixel with G being bright, and R and B being dark. The controller TCON detects the entire detection region by following a cycle with one or more sub-pixels as the minimum repeat unit.

Optionally, the first grayscale-condition and the first area-condition can be satisfied either individually or both. When only the grayscale-display-abnormality occurs in the detection region during display without any area-display abnormality, only the first grayscale-condition may be determined, and polarity adjustment on the signal transmission line of the display device may be performed on the picture that satisfies the first grayscale-condition.

When only the area-display-abnormality occurs in the detection region during display without any grayscale-display-abnormality, only the first area-condition may be determined, and polarity adjustment on the signal transmission line of the display device may be performed on the picture that satisfies the first area-condition.

When the display area abnormality and display grayscale abnormality occur in the detection region during display, the first grayscale-condition and the first area-condition may be determined, and polarity adjustment on the signal transmission line of the display device is performed on the image that satisfies the first grayscale-condition and the first area-condition.

It can be understood that, when no picture that satisfies the first grayscale-condition and/or the first area-condition is detected, the PDF is unable to be hit, that is, the detection is unable to be executed, and the set signal DOT_C, signal POLC, and signal POL are unable to be output to change the polarity of the data line.

At 400, exit polarity adjustment when the target image data satisfies a second grayscale-condition or a second area-condition. A condition range in which the second grayscale-condition is satisfied is less than a condition range in which the first grayscale-condition is not satisfied, and a range in which the second area-condition is satisfied is less than a range in which the first area-condition is not satisfied.

After the PDF is started, a next frame of the target image data is continued to be detected. When the target image data satisfies the second grayscale-condition or the second area-condition, exit polarity adjustment, i. e. exit a PDF execution stage, and the set signal DOT_C, signal POLC, and signal POL for changing the polarity of the data line are no longer output.

The condition range in which the second grayscale-condition is satisfied is less than the condition range in which the first grayscale-condition is not satisfied. For example, the first grayscale-condition is that a relatively large grayscale (namely, a grayscale of a bright sub-pixel) of a sub-pixel in the detection region is greater than or equal to the first preset grayscale, and a relatively small grayscale (namely, a grayscale of a dark sub-pixel) of a sub-pixel in the detection region is less than or equal to a second preset grayscale, where the first preset grayscale is greater than the second preset grayscale.

A condition range in which the first grayscale-condition is not satisfies refers to that the relatively large grayscale of the sub-pixel is less than the first preset grayscale and the relatively small grayscale of the sub-pixel is greater than the second preset grayscale.

The second grayscale-condition is that the relatively large grayscale (namely, the grayscale of the bright sub-pixel) of the sub-pixel in the detection region is less than or equal to a third preset grayscale, and the relative small grayscale (namely, the grayscale of the dark sub-pixel) of the sub-pixel in the detection region is greater than or equal to the fourth preset grayscale. The third preset grayscale is less than the first preset grayscale, and the fourth preset grayscale is greater than or equal to the second preset grayscale.

It can be understood that, an upper limit of the second grayscale-condition is less than an upper limit that does not satisfy the first grayscale-condition, and a lower limit of the second grayscale-condition is greater than a lower limit that does not satisfy the first grayscale-condition.

Compared with an implementation that the relative large grayscale of the sub-pixel in the detection region is less than or equal to the first preset grayscale and the relative small grayscale of the sub-pixel is greater than or equal to the second preset grayscale, a condition for exiting the PDF execution stage proposed in this implementation are more stringent, such that polarity adjustment on the signal transmission line of the display device is performed on more pictures. In this way, the compatibility of the PDF execution stage is improved according to the above standards for entering the execution stage and exiting the execution stage, and display abnormality processing is performed on more pictures, thereby improving the picture display quality.

The range in which the second area-condition is satisfied is less than the range in which the first area-condition is not satisfied.

For example, the first area-condition includes that the ratio of the area of the repeat units in the detection region to the entire detection area is greater than or equal to a first preset ratio. The first area-condition being not satisfied is that the ratio of the area of repeat units in the detection region to the entire detection area is less than the first preset ratio.

The second area-condition is that the ratio of the area of the repeat units in the detection area to the entire detection area is less than or equal to a second preset ratio, where the second preset ratio is less than the first preset ratio.

It can be understood that, because the upper limit of the second area-condition is less than the upper limit that does not satisfy the first area-condition, the range of the second area-condition is less than the range that does not satisfy the first area-condition.

Compared with an implementation in which the ratio of the area of the repeat units in the detection region to the entire detection area is less than the first preset ratio, the condition for exiting the PDF execution stage proposed in this implementation are more stringent, such that polarity adjustment on the signal transmission line of the display device is performed on more pictures. in this way, the compatibility of the PDF execution stage is improved according to the above standards for entering the execution stage and exiting the execution stage, and display abnormality processing is performed on more pictures, thereby improving picture display quality.

The image processing method provided in the present disclosure includes the following. The target image data is received, and picture detection is performed on the target image data. When the target image data satisfies the first grayscale-condition and/or the first area-condition, execute polarity adjustment on the signal transmission line of the display device. When the target image data satisfies the second grayscale-condition or the second area-condition, exit polarity adjustment. A condition range in which the second grayscale-condition is satisfied is less than a condition range in which the first grayscale-condition is not satisfied, and a range in which the second area-condition is satisfied is less than a range in which the first area-condition is not satisfied. After polarity adjustment on the signal transmission line of the display device is started, in the case where a relatively large area of grayscale abnormality or area abnormality may occur in the received target image data, the polarity adjustment function may still be effective. When a larger area of abnormal display or a larger grayscale abnormality occurs, the polarity adjustment function can exit, so as to adapt more target image data with the polarity adjustment function, thereby increasing a range of target image data adapted to the polarity adjustment function, increasing the compatibility of the polarity adjustment function, ameliorating crosstalk and other abnormalities in a display picture, and improving the picture display quality.

Figure 9:
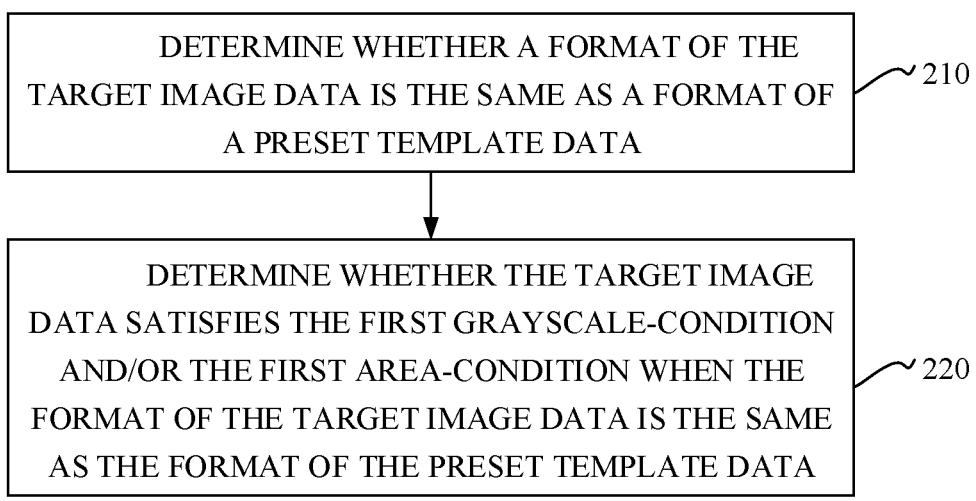
FIG. 9 is a schematic flowchart of operations at 200 in FIG. 6.

In a possible implementation, please refer to FIG. 9, performing picture detection on the target image data at 200 includes the following.

At 210, whether a format of the target image data is the same as a format of a preset template data is determined.

The controller stores multiple preset template data, and each preset template data is different. The number and specific content of preset template data are not specifically limited in the present disclosure. The preset template data is a picture with a certain logic, for example, having two grayscales, i. e., a bright grayscale and a dark grayscale, such as containing a black rectangle on a white background, or a picture formed by multiple repeat units, in which the sub-pixel units are arranged in a pattern of bright-dark-bright-dark, or bright-dark-bright, bright-dark-bright, and so on. The repeat units are repeated in a cyclical manner in which one pixel has a bright R and B and a dark G, and an adjacent pixel has a bright G and a dark R and B.

The format of the target image data refers to the logic described above, for example, a black rectangle on a white background, a picture formed by multiple repeat units, or the like.

At 220, if the format of the target image data is determined to be the same as the format of the preset template data through comparison, proceed to operations at 300 to determine whether the target image data satisfies the first grayscale-condition and/or the first area-condition.

If the format of the target image data is determined to be the same as the format of the preset template data through comparison, it indicates that the picture is detected.

Generally, fluctuation of a common voltage can easily cause abnormal display problems such as crosstalk and greenish in the picture displayed by the preset template data. Therefore, by determining whether the format of the target image data is the same as the format of the preset template data, a picture that is susceptible to crosstalk, greenish, and other abnormal display problems due to the influence of the fluctuation of common voltage can be screened out from the picture data received, and data-line polarity adjustment function is executed on the detection picture that is susceptible to abnormal display problems such as crosstalk and greenish, so as to improve image processing efficiency.

It can be understood that the format of the target image data is the same as the format of the preset template data in the present disclosure, which includes the logic of the picture received is the same as the logic of the preset picture stored, and allows for minor difference in details during display. For example, grayscales of the preset picture present as a black rectangle on a white background, and grayscales of the picture received present as a black rectangle on a white background. In the preset picture, brightness of the white background is slightly greater than brightness of the white background in the picture received, and in this case, the format of the target image data may still be considered the same as the format of the preset template data. Optionally, for example, if the preset picture presents a repeated pattern of bright and dark, and the picture received also presents a repeated pattern of bright and dark but with a small region not following the pattern. In this case, the format of the target image data may still be considered the same as the format of the preset template data.

Conditions for performing polarity adjustment on the signal transmission line of the display device provided in the present disclosure include, but are not limited to, the following.

Figure 10:
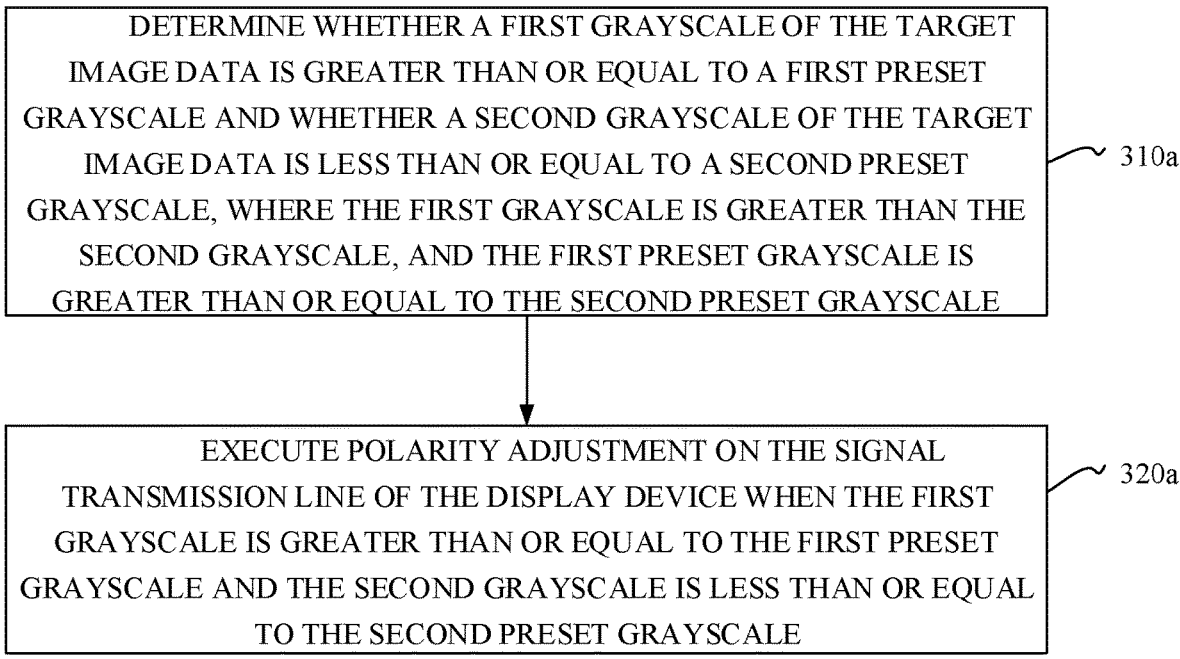
FIG. 10 is a schematic flowchart of operations at 300 in FIG. 6 provided in an implementation.

In a first possible implementation, please refer to FIG. 10, executing polarity adjustment on the signal transmission line of the display device when the target image data satisfies the first grayscale-condition and/or the first area-condition at 300 includes the following.

At 310*a*, determine whether a first grayscale of the target image data is greater than or equal to a first preset grayscale and whether a second grayscale of the target image data is less than or equal to a second preset grayscale, where the first grayscale is greater than the second grayscale, and the first preset grayscale is greater than or equal to the second preset grayscale.

At 320a, executing polarity adjustment on the signal transmission line of the display device when the first grayscale is greater than or equal to the first preset grayscale and the second grayscale is less than or equal to the second preset grayscale.

For ease of description, executing polarity adjustment on the signal transmission line of the display device is defined as enabling a PDF in the present disclosure.

In this implementation, when a relatively large first grayscale in the detection region is greater than or equal to the first preset grayscale, and a relatively small second grayscale is less than or equal to a second preset grayscale, enable the PDF to execute polarity adjustment on the signal transmission line of the display device, so as to change the polarity of the data line, and ameliorate fluctuation of the voltage on the common electrode line due to the coupling effect of the data line, thereby avoiding abnormal display problems such as crosstalk and greenish and improving the quality of the display picture.

It can be understood that, the first preset grayscale and the second preset grayscale each are not specifically limited in the present disclosure, and optionally, the first preset grayscale is not less than 31, and the second preset grayscale is not greater than 63. Optionally, the first preset grayscale and the second preset grayscale each are 100. Certainly, in other implementations, the first preset grayscale may be 100, the second preset grayscale is 31, and so on, which are not enumerated herein.

Figure 11:
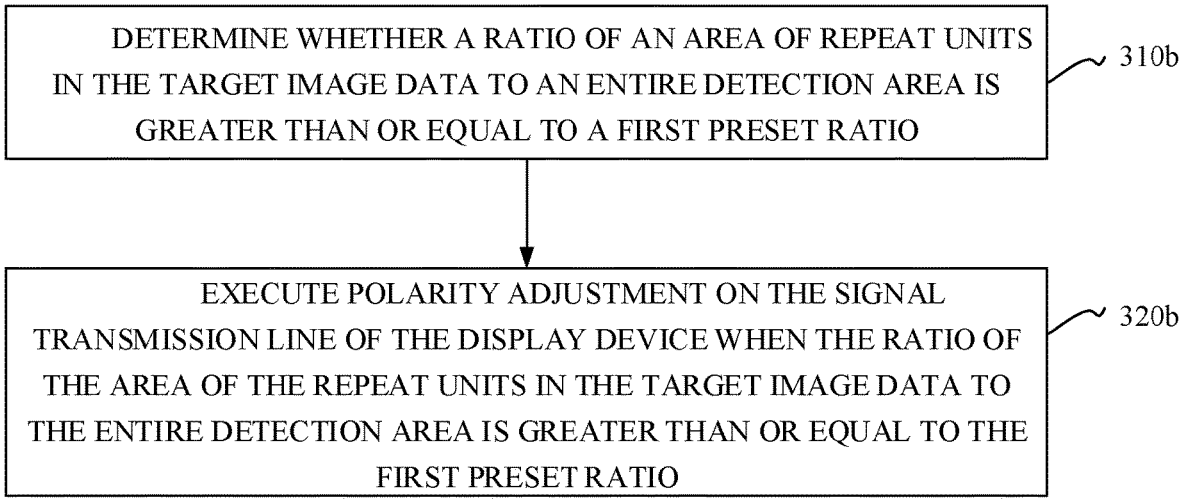
FIG. 11 is a schematic flowchart of operations at 300 in FIG. 6 provided in an implementation.

In a second possible implementation, please refer to FIG. 11, executing polarity adjustment on the signal transmission line of the display device when the target image data satisfies the first grayscale-condition and/or the first area-condition at 300 includes the following.

At 310b, determine whether a ratio of the area of repeat units in the target image data to the entire detection area is greater than or equal to a first preset ratio.

At 320b, if the ratio of the area of repeat units in the target image data to the entire detection area is greater than or equal to the first preset ratio, execute polarity adjustment the signal transmission line of the display device.

It can be understood that, the preset template data includes a picture formed by minimum repeat units arranged at intervals. The minimum repeat unit includes, but is not limited to, multiple sub-pixel units, or one or more pixel units.

In this implementation, when the ratio of the area of the repeat units in the target image data in the detection region to the entire detection area is greater than or equal to the first preset ratio, enable the PDF to execute polarity adjustment on the signal transmission line of the display device, so as to change the polarity of the data line, and ameliorate fluctuation of the voltage on the common electrode line due to the coupling effect of the data lines, thereby avoiding abnormal display problems such as crosstalk and greenish, and improving the quality of the display picture.

It can be understood that the first preset ratio is not specifically limited in the present disclosure, and optionally the first preset ratio is greater than or equal to 95%. Optionally, the first preset ratio may also be greater than or equal to 94%, 96%, and so on, which is not enumerated herein.

Figure 12:
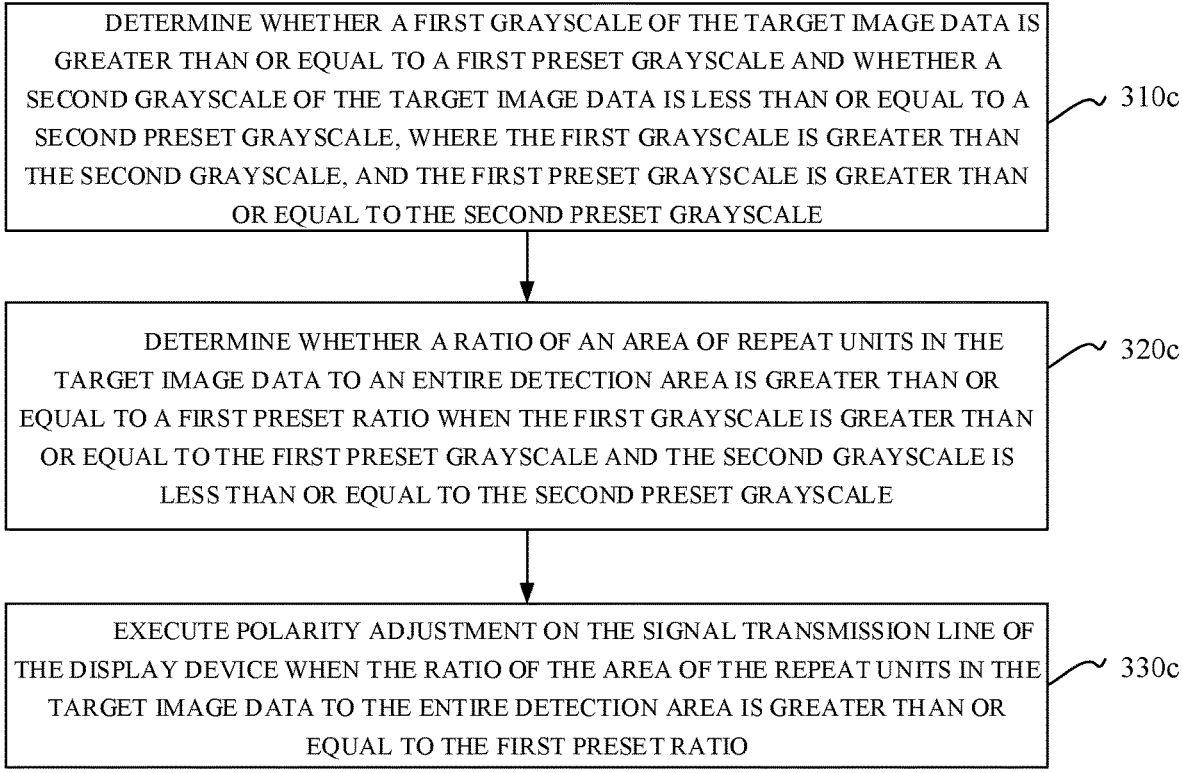
FIG. 12 is a schematic flowchart of operations at 300 in FIG. 6 provided in an implementation.

In a third possible implementation, please refer to FIG. 12, executing polarity adjustment on the signal transmission line of the display device when the target image data satisfies the first grayscale-condition and/or the first area-condition at 300 includes the following.

At 310c, determine whether a first grayscale of the target image data is greater than or equal to a first preset grayscale and whether a second grayscale of the target image data is less than or equal to a second preset grayscale, where the first grayscale is greater than the second grayscale, and the first preset grayscale is greater than or equal to the second preset grayscale.

At 320c, if the first grayscale is greater than or equal to the first preset grayscale and the second grayscale is less than or equal to the second preset grayscale, determine whether a ratio of the area of repeat units in the target image data to the entire detection area is greater than or equal to a first preset ratio.

At 330c, if the ratio of the area of repeat units in the target image data to the entire detection area is greater than or equal to the first preset ratio, execute polarity adjustment the signal transmission line of the display device.

In this implementation, first determine that a relatively large first grayscale in the detection region is greater than or equal to the first preset grayscale, and a relatively small second grayscale is less than or equal to the second preset grayscale, then determine that the ratio of the area of the repeat units in target image data in the detection region to the entire detection area is greater than or equal to the first preset ratio, and thus a PDF is enabled under more conditions. Polarity adjustment on the signal transmission line of the display device is executed, so as to change the polarity of the data line, and ameliorate fluctuation of the voltage on the common electrode line due to the coupling effect of the data lines, thereby avoiding abnormal display problems such as crosstalk and greenish, and improving the quality of the display picture.

The conditions for exiting polarity adjustment on the signal transmission line of the display device provided by the present disclosure include, but are not limited to, the following implementations.

Figure 13:
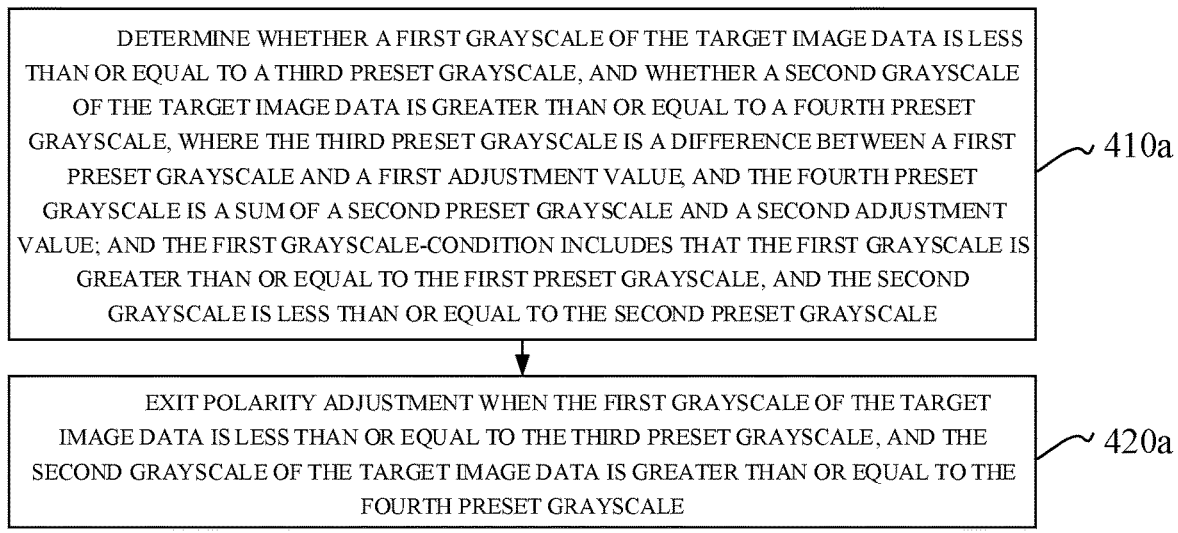
FIG. 13 is a schematic flowchart of operations at 400 in FIG. 6 provided in an implementation.

In a first possible implementation, please refer to FIG. 13, exiting polarity adjustment when the target image data satisfies a second grayscale-condition or a second area-condition at 400 includes the following.

At 410a, determine whether a first grayscale of the target image data is less than or equal to a third preset grayscale, and whether a second grayscale of the target image data is greater than or equal to a fourth preset grayscale, where the third preset grayscale is a difference between the first preset grayscale and a first adjustment value, and the fourth preset grayscale is a sum of a second preset grayscale and a second adjustment value. The first grayscale-condition includes that the first grayscale is greater than or equal to the first preset grayscale, and the second grayscale is less than or equal to the second preset grayscale.

At 420a, exit polarity adjustment if the first grayscale of the target image data is less than or equal to the third preset grayscale, and the second grayscale of the target image data is greater than or equal to the fourth preset grayscale.

The first adjustment value is not specifically limited in the present disclosure, and the first adjustment value may be a positive value, a negative value, or 0. When the first adjustment value is a positive value, the third preset grayscale is less than or equal to the first grayscale. For example, $-10 \leq$ the first adjustment value $\leq 10$, or $-8 \leq$ the first adjustment value $\leq 8$, or $-12 \leq$ the first adjustment value $\leq 12$.

The second adjustment value is not specifically limited in the present disclosure, and the second adjustment value may be a positive value, a negative value, or 0. When the second adjustment value is a positive value, the fourth preset grayscale is greater than or equal to the second grayscale, for example, −5≤the second adjustment value≤5, or −4≤the second adjustment value≤4, or −6≤the second adjustment value≤6, or −10≤the second adjustment value≤10.

In this implementation, when the relatively large first grayscale in the detection region is less than or equal to the third preset grayscale, and the relatively smaller second grayscale is greater than or equal to the fourth preset grayscale, exit the PDF. A range of pictures for which the PDF is exited is larger than a range of pictures for which a condition for enabling the PDF is not satisfied, in other words, the condition for exiting the PDF becomes more stringent, the PDF are executed on more detection pictures to adjust the polarity of the data line when more detection pictures are displayed, so as to ameliorate fluctuation of the voltage on the common electrode line due to the coupling effect of the data line, thereby avoiding abnormal display problems such as crosstalk and greenish and improving the quality of the display picture.

In a second possible implementation, please refer to FIG. 14, exiting polarity adjustment when the target image data satisfies a second grayscale-condition or a second area-condition at 400 includes the following.

At 410b, determine whether a ratio of an area of repeat units in the target image data to an entire detection area is less than or equal to a second preset ratio, where the second preset ratio is a difference between a first preset ratio and a third adjustment value, and the first area-condition includes whether the ratio of the area of repeat units in the target image data to the entire detection area is greater than or equal to the first preset ratio.

At 420b, if the ratio of an area of repeat units in the target image data to the entire detection area is less than or equal to the second preset ratio, exit polarity adjustment.

The third adjustment value is not specifically limited in the present disclosure, and, optionally, the third adjustment value satisfies: −5%≤R≤5%.

In the present implementation, according to whether the ratio of the area of the repeat units in the target image data to the entire detection area is less than or equal to the second preset ratio, exit the PDF. As such, a range of pictures for which the PDF is exited is larger than a range of pictures for which a condition for enabling the PDF is not satisfied, in other words, the condition for exiting from the PDF becomes more stringent, the PDF are executed on more detection pictures to adjust the polarity of the data line when more detection pictures are displayed, so as to ameliorate fluctuation of the voltage on the common electrode line due to the coupling effect of the data line, thereby avoiding abnormal display problems such as crosstalk and greenish and improving the quality of the display picture.

It can be understood that, the condition for enabling the PDF to adjust the polarity of the data line may be the same as or different from the condition for exiting the PDF. For example, the PDF may be enabled under a grayscale condition, and the PDF may be exited under an area condition; or the PDF may be enabled under the area condition, and the PDF may be exited under the grayscale condition.

In a possible implementation, please refer to FIG. 15, execute polarity adjustment on the signal transmission line of the display device include the following.

At 340, a first control signal, a second control signal, and a third control signal are output.

At 350, a potential of any one of the first control signal, the second control signal, and the third control signal is changed, to make an abnormal parameter of the target image data subject to polarity adjustment is in a preset specification.

The first control signal is signal DOT_C, the second control signal is signal POL, and the third control signal is signal POLC.

Please refer to FIG. 16, a frame includes a vertical active region (Vact) and a vertical blank region (Vblank), the vertical blank region (Vblank) is used for various operations and data processing, during the operation, a control signal is sent to a driving integrated circuit (IC), and then the driving IC displays actual data in a vertical active region (Vact) of a next frame.

Figures 17, 18:
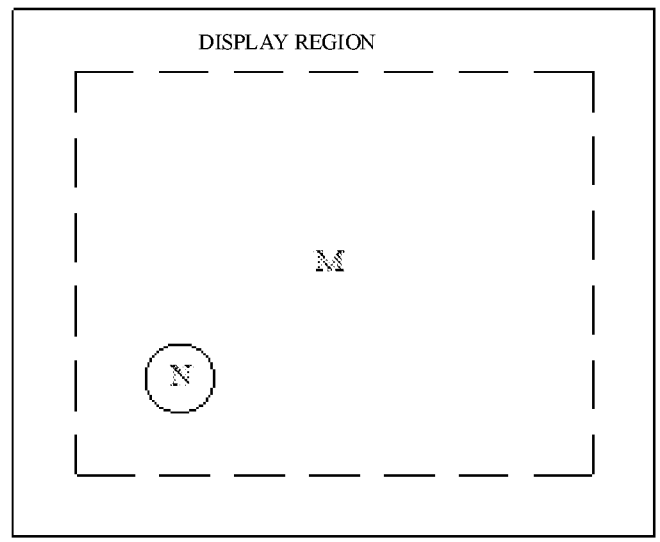
FIG. 17 is a diagram of relationship between potentials of signal DOT_C, signal POL signal, signal POLC and polarities of a data line.
FIG. 18 is a schematic diagram illustrating an area-display-abnormality in a detection image.

Once the PDF is enabled, signal DOT_C/ signal POL/ signal POLC output by the TCON may change at any interval in VBlank, and high/low (H/L) potential switching of signal DOT_C/ signal POL/ signal POLC corresponds to an output situation as illustrated in FIG. 17. For example, signal DOT_C, signal POL, and signal POLC each are at L potential, and potentials of data lines Y1, Y2, Y3, Y4, Y5 and Y6 are respectively: +, −, +, −, +, −. After the PDF is enabled, a change rule of signal DOT_C/ signal POL/ signal POLC is not specifically limited. For example, the potential of signal POLC changes to H, and at this time potentials of data lines Y1, Y2, Y3, Y4, Y5 and Y6 are changed to: −, +, −, +, −, +, etc. Whether an abnormal parameter displayed abnormally such as crosstalk and greenish is in the preset description is detected. If the abnormal parameter displayed abnormally such as crosstalk and greenish is not in the preset description is detected, the potential of one of signal DOT_C, signal POL, or signal POLC is continuously changed until the abnormal parameter displayed abnormally such as crosstalk and greenish is in the preset description is detected. The potential of one of signal DOT_C, signal POL, or signal POLC is adjusted in eight ways as listed in a table and is not limited to an order in the table.

It can be seen from FIG. 17 that, as long as the TCON outputs different signal DOT_C/ signal POL/ signal POLC (namely, the potential of any one of signal DOT_C, signal POL, or signal POLC is changed), the polarity of the data line may change, so as to reduce the voltage fluctuation of the common electrode and avoid problems of crosstalk and greenish.

Once the PDF is exited, the TCON can switch signal DOT_C / signal POL / signal POLC output in accordance with routine back to preset values at any interval in Vblank. The preset values are values of signal DOT_C / signal POL / signal POLC required for display of a next frame. The preset values of DOT_C signal/POL signal/POLC signal can be the same or different for display of each frame. In other words, when the PDF is exited, the preset values of signal DOT_C / signal POL / signal POLC for a frame that are switched back to by the TCON, are not related to initial values of signal DOT_C / signal POL / signal POLC for said frame.

If signal DOT_C, signal POL, and signal POLC each are changed as illustrated in FIG. 17, and the abnormal parameter displayed abnormally such as crosstalk and greenish is still unable to be in the preset specification, the following implementations will be performed.

In a possible implementation, when whether to enable or exit the PDF is determined according to the grayscale condition, after executing polarity adjustment on the signal transmission line of the display device, the method further includes the following.

Whether an abnormal parameter of the target image data subject to polarity adjustment is in a preset specification is determined.

If the abnormal parameter of the target image data subject to polarity adjustment is in the preset specification, record the current first preset grayscale, the second preset grayscale, the first adjustment value, the second adjustment value, the potential of signal DOT_C, the potential of signal POL, and the potential of signal POLC into the TCON.

If the abnormal parameter of the target image data subject to polarity adjustment is not in the preset specification, at least one of the first preset grayscale, the second preset grayscale, the first adjustment value, and the second adjustment value in the second grayscale-condition is adjusted, and polarity adjustment on the signal transmission line of the display device is executed again until the abnormal parameter of the target image data is in the preset specification, and then when the abnormal parameter of the target image data is in the preset specification, the first preset grayscale, the second preset grayscale, the first adjustment value, the second adjustment value, the potential of signal DOT_C, the potential of signal POL, and the potential of signal POLC are recorded into the TCON.

In a possible implementation, when whether to enable or exit the PDF is determined according to the area condition, after executing polarity adjustment on the signal transmission line of the display device, the method further includes the following.

Whether the abnormal parameter of target image data subject to polarity adjustment is in a preset specification is determined. If the abnormal parameter of the target image data subject to polarity adjustment is in the preset specification, record the current first preset ratio, the third adjustment value, the potential of the signal DOT_C, the potential of signal POL, and the potential of signal POLC into the TCON.

If the abnormal parameter of the target image data subject to polarity adjustment is not in the preset specification, at least one of the first preset ratio and the third adjustment value in the second area-condition is adjusted, and polarity adjustment on the signal transmission line of the display device is executed again until the abnormal parameter of the target image data is in the preset specification, and when the abnormal parameter of the target image data is in the preset specification, the first preset ratio, the third adjustment value, the potential of signal DOT_C, the potential of signal POL, and the potential of signal POLC are recorded into the TCON.

For example, the preset template data is a picture formed by a bright sub-pixel and a dark sub-pixel as the minimum repeat unit.

For illustrative purpose, the PDF is enabled according to the grayscale condition, and the PDF is exited according to the grayscale condition. The first grayscale is a grayscale when the sub-pixel point is bright (i.e., on), and the second grayscale is a grayscale when the sub-pixel point is black (i.e., off). The detection picture has the following cases.

a) Condition 1→≥Pixel on≥H and Pixel off≤L, hit;
    b) Condition 2→>Pixel on≤H-A and Pixel off≥L+B, exit;
    c) condition 3→>i. only one condition in condition 1 is satisfied, i. e. Pixel on≥H and Pixel off>L, or Pixel on<H and Pixel off≤L; ii. only one condition in condition 2 is satisfied, i. e. Pixel on≤H-A and Pixel off<L+B, or Pixel on>H-A and Pixel off≥L+B; iii. Both condition 1 and condition 2 are not met, H-A<Pixel on<H and L<Pixel off<L+B.

Pixel on represents the first grayscale, pixel off represents the second grayscale, H represents the first preset grayscale, L represents the second preset grayscale, A represents the first adjustment value, B represents the second adjustment value, "hit" represents that the PDF is enabled; and "exit" represents the PDF is exited.

During detection, only when condition 1 is satisfied can the PDF be enabled, and after the PDF is enabled, only when condition 2 is satisfied can the PDF be exited. By setting A and B, exiting the PDF is delayed relative to enabling the PDF.

Assuming that condition 1/condition 3/condition 2/condition 3/condition 1 are satisfied in sequence during detection, the PDF is hit/hit/exited/exited/hit correspondingly.

Obviously, after the PDF is enabled, if there is a detection picture that satisfies condition 3, the PDF can also be executed on this detection picture, and thus more detection pictures are subject to the PDF, so as to improve the image quality of more detection pictures. However, after the PDF is exited, if there is a detection picture that satisfies condition 3, the PDF is unable to be executed on this detection picture.

The PDF is enabled according to the grayscale condition and exited according to the grayscale condition, which is applicable to a detection picture having a grayscale-display-abnormality without any area-display-abnormality.

Please refer to FIG. 18, in which a dotted box represents a detection picture. When the detection picture has an area-display-abnormality without any grayscale-display-abnormality, the PDF may be enabled under an area condition, and the PDF may be exited under an area condition. For example, the area formed by a bright sub-pixel and a black sub-pixel as the minimum repeat unit in the detection region is M, the area formed by a bright sub-pixel, a bright sub-pixel, a bright sub-pixel, and a bright sub-pixel in the detection region is N, and the entire detection area is M+N. The detection picture has the following cases.

a) Condition 1: (normal display area M/entire detection area (M+N))≥S, hit;
    b) Conditions 2: S-R<(normal display area M/entire detection area (M+N))<S;
    c) Condition 3: (normal display area M/entire detection area (M+N)<S-R, exit;

S represents the first preset ratio, S-R represents the second preset ratio, and R represents the third adjustment value. Optionally, 0≤S≤100%; 0≤S-R≤100%; 0≤R≤100%. Optionally, S≥95%, and R≤5%.

During detection, only when condition 1 is satisfied can the PDF be enabled, and after the PDF is enabled, only when condition 3 is satisfied can the PDF be exited. By setting R, exiting the PDF is delayed relative to enabling the PDF.

Assuming that condition 1/condition 2/condition 3/condition 2/condition 1 are satisfied in sequence during detection, the PDF is hit/hit/exited/exited/hit correspondingly Obviously, after the PDF is enabled, if there is a detection picture that satisfies condition 2, the PDF can also be executed on this detection picture, and thus more detection pictures are subject to the PDF, so as to improve the image quality of more detection pictures. However, after the PDF is exited, if there is a detection picture that satisfies condition 2, the PDF is unable to be executed on this detection picture.

Figure 19:
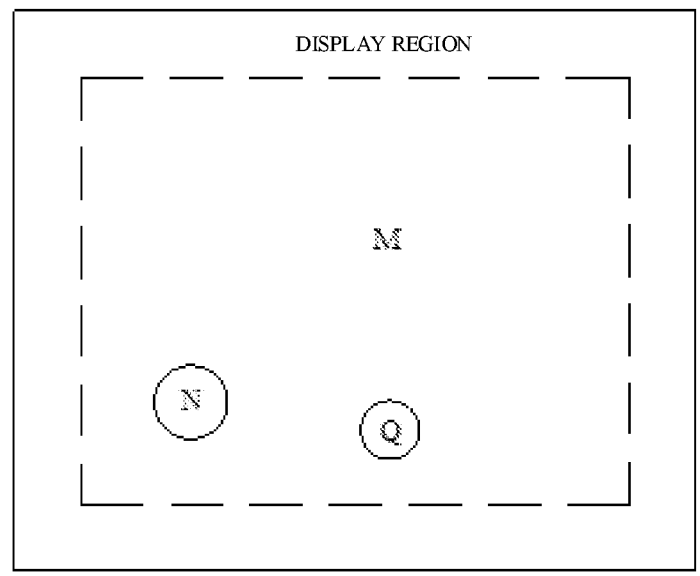
FIG. 19 is a schematic diagram illustrating two area-display-abnormalities in a detection image.

Please refer to FIG. 19, in which a dotted box represents a detection image, and the number of abnormal display regions is not limited in the present disclosure. For example, the area formed by a bright sub-pixel and a black sub-pixel in the detection region as the minimum repeat unit is M, an area formed by partially displaying as a bright sub-pixel, a bright sub-pixel, a bright sub-pixel, and a bright sub-pixel in the detection region is N, an area formed by partially displaying as a black sub-pixel, a black sub-pixel, a black sub-pixel, and a black sub-pixel is Q. The entire detection area is M+N+Q. The number of partial abnormal display and the display effect are not limited in the present disclosure, and may be one, two or more. The display effect of the partial abnormal displays may be the same or different, for example, the partial abnormal displays each contain a bright on sub-pixel, a bright sub-pixel, a bright sub-pixel, and a bright sub-pixel. The detection picture has the following cases.

a) condition 1: (normal area M/entire detection area (M+N+Q))≥S;

b) Conditions 2: S-R<S (normal area M/entire detection area (M+N+Q));

c) Condition 3: (normal area M/entire detection area (M+N+Q))≤S-R;

S represents the first preset ratio, S-R represents the second preset ratio, and R represents the third adjustment value. Optionally, 0≤S≤100%; 0≤S-R≤100%; 0≤R≤100%. optionally, S≥95%, and R≤5%.

During detection, only when condition 1 is satisfied can the PDF be enabled, and after the PDF is enabled, only when condition 3 is satisfied can the PDF be exited. By setting R, exiting the PDF is delayed relative to enabling the PDF.

Assuming that condition 1/condition 2/condition 3/condition 2/condition 1 are satisfied in sequence during detection, the corresponding PDF is: hit/hit/exited/exited/hit.

In addition to determining whether the PDF is enabled according to the greyscale condition, when the detection region is inconsistent with a detection picture, the PDF can also be enabled according to the area condition, so that conditions for entering the PDF are increased, thereby reducing crosstalk and greenish, increasing the applicability of the PDF, increasing the quality of the product, and improving the product competitiveness. By setting the condition range of the area condition for exiting the PDF to be less than the condition range of the area condition for not enabling the PDF, the condition for exiting the PDF becomes stringent. When an abnormal display of a certain area occurs in the detection area, the PDF can still be effective; and only when an abnormal display of a larger area occurs in the detection area, the PDF can be exited.

Figure 20:
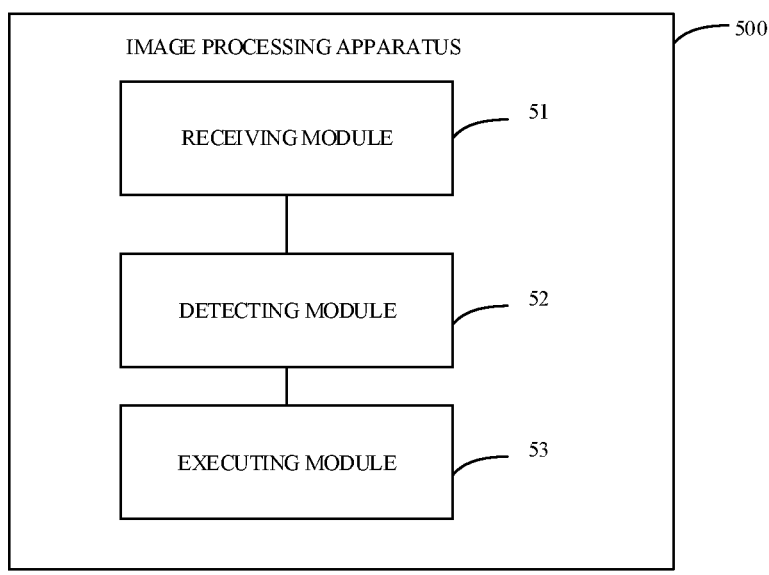
FIG. 20 is a schematic structural diagram of an image processing apparatus provided in an implementation of the present disclosure.

Please refer to FIG. 20, an image processing apparatus is further provided in the present disclosure, the image processing apparatus is used to perform the image processing method in any of the above implementations. The image processing apparatus 500 includes a receiving module 51, a detecting module 52, and an executing module 53.

The receiving module 51 is configured to receive target image data;

The detecting module 52 is configured to perform picture detection on the target image data; and The executing module is configured to execute polarity adjustment on a signal transmission line of a display device when the target image data satisfies a first grayscale-condition and/or a first area-condition; and exit polarity adjustment when the target image data satisfies a second grayscale-condition or a second area-condition, where a condition range in which the second grayscale-condition is satisfied is less than a condition range in which the first grayscale-condition is not satisfied, and a range in which the second area-condition is satisfied is less than a range in which the first area-condition is not satisfied.

The detecting module 52 is configured to determine whether a format of the target image data is the same as a format of a preset template data; and determine whether the target image data satisfies the first grayscale-condition and/ or the first area-condition when the format of the target image data is the same as the format of the preset template data.

The executing module 53 configured to execute polarity adjustment on the signal transmission line of the display device when the target image data satisfies the first grayscale-condition and/or the first area-condition is specifically configured to determine whether a first grayscale of the target image data is greater than or equal to a first preset grayscale and whether a second grayscale of the target image data is less than or equal to a second preset grayscale, where the first grayscale is greater than the second grayscale, and the first preset grayscale is greater than or equal to the second preset grayscale; and execute polarity adjustment on the signal transmission line of the display device when the first grayscale is greater than or equal to the first preset grayscale and the second grayscale is less than or equal to the second preset grayscale. Optionally, the executing module 53 is configured to execute polarity adjustment on the signal transmission line of the display device when the target image data satisfies the first grayscale-condition and/or the first area-condition is specifically configured to determine whether a ratio of an area of repeat units in the target image data to an entire detection area is greater than or equal to a first preset ratio; and execute polarity adjustment on the signal transmission line of the display device when the ratio of the area of the repeat units in the target image data to the entire detection area is greater than or equal to the first preset ratio.

The executing module 53 configured to execute polarity adjustment on the signal transmission line of the display device when the target image data satisfies the first grayscale-condition and/or the first area-condition is specifically configured to determine whether a first grayscale of the target image data is greater than or equal to a first preset grayscale and whether a second grayscale of the target image data is less than or equal to a second preset grayscale, where the first grayscale is greater than the second grayscale, and the first preset grayscale is greater than or equal to the second preset grayscale; determine whether a ratio of an area of repeat units in the target image data to an entire detection area is greater than or equal to a first preset ratio when the first grayscale is greater than or equal to the first preset grayscale and the second grayscale is less than or equal to the second preset grayscale; and execute polarity adjustment on the signal transmission line of the display device when the ratio of the area of the repeat units in the target image data to the entire detection area is greater than or equal to the first preset ratio.

The executing module 53 configured to exit polarity adjustment when the target image data satisfies the second grayscale-condition or the second area-condition is specifically configured to determine whether a first grayscale of the target image data is less than or equal to a third preset grayscale, and whether a second gray scale of the target image data is greater than or equal to a fourth preset grayscale, where the third preset grayscale is a difference between a first preset grayscale and a first adjustment value, and the fourth preset grayscale is a sum of a second preset grayscale and a second adjustment value; and the first grayscale-condition includes that the first grayscale is greater than or equal to the first preset grayscale, and the second grayscale is less than or equal to the second preset grayscale; and exit polarity adjustment when the first grayscale of the target image data is less than or equal to the third preset grayscale, and the second grayscale of the target image data is greater than or equal to the fourth preset grayscale. Optionally, The executing module 53 configured to exit polarity adjustment when the target image data satisfies the second grayscale-condition or the second area-condition is specifically configured to determine whether a ratio of an area of repeat units in the target image data to an entire detection area is less than or equal to a second preset ratio, where the second preset ratio is a difference between a first preset ratio and a third adjustment value, and the first area-condition includes whether the ratio of the area of the repeat units in the target image data to the entire detection area is greater than or equal to the first preset ratio; and exit polarity adjustment when the ratio of the area of the repeat units in the target image data to the entire detection area is less than or equal to the second preset ratio.

The executing module 53 configured to execute polarity adjustment on the signal transmission line of the display device is specifically configured to output a first control signal, a second control signal, and a third control signal; and change a potential of any one of the first control signal, the second control signal, or the third control signal, to make an abnormal parameter of the target image data subject to polarity adjustment is in a preset specification.

The executing module 53 is further configured to, after executing polarity adjustment on the signal transmission line of the display device, determine whether an abnormal parameter of the target image data subject to polarity adjustment is in a preset specification; and when the abnormal parameter of the target image data subject to polarity adjustment is not in the preset specification, adjust at least one of a first preset grayscale, a second preset grayscale, a first adjustment value, and a second adjustment value in the second grayscale-condition, and re-execute polarity adjustment on the signal transmission line of the display device. Optionally, the executing module 53 is further configured to, after executing polarity adjustment on the signal transmission line of the display device, determine whether an abnormal parameter of the target image data subject to polarity adjustment is in a preset specification; and when the abnormal parameter of the target image data subject to polarity adjustment is not in the preset specification, adjust at least one of a first preset ratio or a third adjustment value in the second area-condition, and re-execute polarity adjustment on the signal transmission line of the display device.

The receiving module 51, the detecting module 52, and the executing module 53 each may be, a processor or a controller (for example, a central processing unit (CPU)), a general-purpose processor, a digital signal processor (DSP), an application specific integrated circuit (ASIC), a field programmable gate array (FPGA), or other programmable logic devices, transistor logic devices, hardware components, or any combination thereof. Various exemplary logical blocks, modules, and circuits described in conjunction with the disclosure may be achieved or implemented. The processor may also be a combination of computing functions, for example, a combination of one or more microprocessors, a combination of the DSP and the microprocessor, and the like.

A non-transitory storage medium is further provided in the present disclosure. The non-transitory storage medium is computer-readable medium. The storage medium stores a computer program, and the computer program, when executed by a processor, is configured to implement the method provided in any implementation in the present disclosure. The method includes the operations at 100 to 400.

At 100, target image data is received.

At 200, picture detection is performed on the target image data.

At 300, when the target image data satisfies a first grayscale-condition and/or a first area-condition, execute polarity adjustment on a signal transmission line of the display device.

At 400, exit polarity adjustment when the target image data satisfies a second grayscale-condition or a second area-condition. A condition range in which the second grayscale-condition is satisfied is less than a condition range in which the first grayscale-condition is not satisfied, and a range in which the second area-condition is satisfied is less than a range in which the first area-condition is not satisfied.

In terms of performing picture detection on the target image data, the computer program when executed by the processor is specifically configured to determine whether a format of the target image data is the same as a format of a preset template data; and determine whether the target image data satisfies the first grayscale-condition and/or the first area-condition when the format of the target image data is the same as the format of the preset template data.

In terms of executing polarity adjustment on the signal transmission line of the display device when the target image data satisfies the first grayscale-condition and/or the first area-condition, the computer program when executed by the processor is specifically configured to determine whether a first grayscale of the target image data is greater than or equal to a first preset grayscale and whether a second grayscale of the target image data is less than or equal to a second preset grayscale, where the first grayscale is greater than the second grayscale, and the first preset grayscale is greater than or equal to the second preset grayscale; and execute polarity adjustment on the signal transmission line of the display device when the first grayscale is greater than or equal to the first preset grayscale and the second grayscale is less than or equal to the second preset grayscale. Optionally, in terms of executing polarity adjustment on the signal transmission line of the display device when the target image data satisfies the first grayscale-condition and/or the first area-condition, the computer program when executed by the processor is specifically configured to execute polarity adjustment on the signal transmission line of the display device when the target image data satisfies the first grayscale-condition and/or the first area-condition includes: determine whether a ratio of an area of repeat units in the target image data to an entire detection area is greater than or equal to a first preset ratio; and execute polarity adjustment on the signal transmission line of the display device when the ratio of the area of the repeat units in the target image data to the entire detection area is greater than or equal to the first preset ratio.

In terms of executing polarity adjustment on the signal transmission line of the display device when the target image data satisfies the first grayscale-condition and/or the first area-condition, the computer program when executed by the processor is specifically configured to determine whether a first grayscale of the target image data is greater than or equal to a first preset grayscale and whether a second grayscale of the target image data is less than or equal to a second preset grayscale, where the first grayscale is greater than the second grayscale, and the first preset grayscale is greater than or equal to the second preset grayscale; determine whether a ratio of an area of repeat units in the target image data to an entire detection area is greater than or equal to a first preset ratio when the first grayscale is greater than or equal to the first preset grayscale and the second grayscale is less than or equal to the second preset grayscale; and execute polarity adjustment on the signal transmission line of the display device when the ratio of the area of the repeat units in the target image data to the entire detection area is greater than or equal to the first preset ratio.

In terms of exiting polarity adjustment when the target image data satisfies the second grayscale-condition or the second area-condition, the computer program when executed by the processor is specifically configured to determine whether a first grayscale of the target image data is less than or equal to a third preset grayscale, and whether a second grayscale of the target image data is greater than or equal to a fourth preset grayscale, where the third preset grayscale is a difference between a first preset grayscale and a first adjustment value, and the fourth preset grayscale is a sum of a second preset grayscale and a second adjustment value; and the first grayscale-condition includes that the first grayscale is greater than or equal to the first preset grayscale, and the second grayscale is less than or equal to the second preset grayscale; and exit polarity adjustment when the first grayscale of the target image data is less than or equal to the third preset grayscale, and the second grayscale of the target image data is greater than or equal to the fourth preset grayscale. Optionally, in terms of exiting polarity adjustment when the target image data satisfies the second grayscale-condition or the second area-condition, the computer program when executed by the processor is specifically configured to determine whether a ratio of an area of repeat units in the target image data to an entire detection area is less than or equal to a second preset ratio, where the second preset ratio is a difference between a first preset ratio and a third adjustment value, and the first area-condition includes whether the ratio of the area of the repeat units in the target image data to the entire detection area is greater than or equal to the first preset ratio; and exit polarity adjustment when the ratio of the area of the repeat units in the target image data to the entire detection area is less than or equal to the second preset ratio.

In terms of executing polarity adjustment on the signal transmission line of the display device, the computer program when executed by the processor is specifically configured to output a first control signal, a second control signal, and a third control signal; and change a potential of any one of the first control signal, the second control signal, or the third control signal, to make an abnormal parameter of the target image data subject to polarity adjustment is in a preset specification.

In terms of executing polarity adjustment on the signal transmission line of the display device, the computer program when executed by the processor is specifically configured to determine whether an abnormal parameter of the target image data subject to polarity adjustment is in a preset specification; and when the abnormal parameter of the target image data subject to polarity adjustment is not in the preset specification, adjust at least one of a first preset grayscale, a second preset grayscale, a first adjustment value, and a second adjustment value in the second grayscale-condition, and re-execute polarity adjustment on the signal transmission line of the display device. Optionally, in terms of executing polarity adjustment on the signal transmission line of the display device, the computer program when executed by the processor is specifically configured to determine whether an abnormal parameter of the target image data subject to polarity adjustment is in a preset specification; and when the abnormal parameter of the target image data subject to polarity adjustment is not in the preset specification, adjust at least one of a first preset ratio or a third adjustment value in the second area-condition, and re-execute polarity adjustment on the signal transmission line of the display device.

Optionally, in this implementation, the storage medium may include, but is not limited to, any medium that can store program codes, such as a universal serial bus (USB) flash disk, a read only memory (ROM), a random access memory (RAM), a mobile hard disk, a magnetic disk, or an optical disk. Optionally, in this implementation, the processor executes the method described in the foregoing implementations according to program codes stored in the storage medium. Optionally, for specific examples in this implementation, reference may be made to examples described in the foregoing implementations and optional implementations, which will not be repeatedly described herein in this implementation. Obviously, those skilled in the art should understand that each module or each step in the present disclosure can be implemented by a general computing device, said each module or each step may be centralized on a single computing device or distributed on a network composed of multiple computing devices. Optionally, said each module or each step can be implemented by using program codes executable by the computing device, so that they can be stored in a storage device and executed by the computing device. Furthermore, in some cases, these illustrated or described operations may be executed in an order different from an order described here, or said each module or each step can be made into an integrated circuit module respectively, or multiple modules or operations therein are made into a single integrated circuit module for implementation. Thus any particular combination of hardware and software is not limited in the present disclosure.

Figure 21:
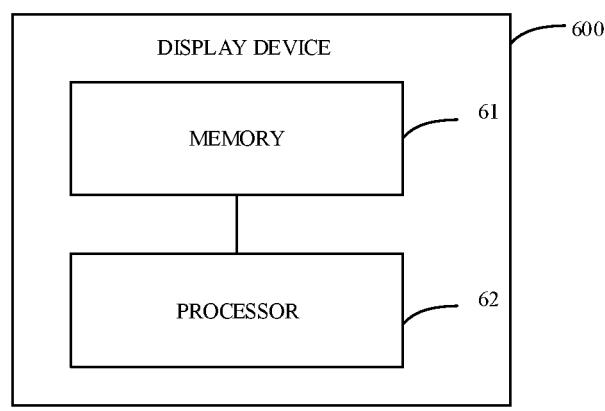
FIG. 21 is a schematic structural diagram of a display device provided in an implementation of the present disclosure.

Please refer to FIG. 21, a display device 600 is further provided in the present disclosure. A schematic structural diagram of the display device 600 is as illustrated in FIG. 21. The display device 600 at least includes a memory 61 and a processor 62. The memory 61 stores a computer program, and the processor 62 is configured to implement the method provided in any implementation of the present disclosure when executing the computer program in the memory 61. The processor may be one chip or multiple chips. The processor includes, but is not limited to, the foregoing image processing apparatus 500.

Although the implementations of the present disclosure have been illustrated and described, it should be understood that the above implementations are illustrative and cannot be construed as limitations to the present disclosure. Those skilled in the art can make changes, modifications, replacements, and variations to the above implementations within the scope of the present disclosure, and these changes and modifications shall also belong to the scope of protection of the present disclosure.

What is claimed is:

1. A display device comprising at least a memory and a processor, wherein the memory stores a computer program, and when executing the computer program in the memory, the processor is configured to:
   receive target image data;
   perform picture detection on the target image data;
   execute polarity adjustment on a signal transmission line of the display device when the target image data satisfies a first grayscale-condition and/or a first area-condition; and
   exit polarity adjustment when the target image data satisfies a second grayscale-condition or a second area-condition, wherein a condition range in which the second grayscale-condition is satisfied is less than a condition range in which the first grayscale-condition is not satisfied, and a range in which the second area-condition is satisfied is less than a range in which the first area-condition is not satisfied; wherein:
in terms of exiting polarity adjustment when the target image data satisfies the second grayscale-condition or the second area-condition, the processor is configured to:
determine whether a first grayscale of the target image data is less than or equal to a third preset grayscale, and whether a second gray scale of the target image data is greater than or equal to a fourth preset grayscale, wherein the third preset grayscale is a difference between a first preset grayscale and a first adjustment value, and the fourth preset grayscale is a sum of a second preset grayscale and a second adjustment value; and
the first grayscale-condition comprises that the first grayscale is greater than or equal to the first preset grayscale, and the second grayscale is less than or equal to the second preset grayscale; and exit polarity adjustment when the first grayscale of the target image data is less than or equal to the third preset grayscale, and the second grayscale of the target image data is greater than or equal to the fourth preset grayscale; or, in terms of exiting polarity adjustment when the target image data satisfies the second grayscale-condition or the second area-condition, the processor is configured to:
determine whether a ratio of an area of repeat units in the target image data to an entire detection area is less than or equal to a second preset ratio, wherein the second preset ratio is a difference between a first preset ratio and a third adjustment value, and the first area-condition comprises whether the ratio of the area of the repeat units in the target image data to the entire detection area is greater than or equal to the first preset ratio; and exit polarity adjustment when the ratio of the area of the repeat units in the target image data to the entire detection area is less than or equal to the second preset ratio.

2. The display device according to claim 1, wherein in terms of performing picture detection on the target image data, the processor is configured to:
determine whether a format of the target image data is the same as a format of a preset template data; and
determine whether the target image data satisfies the first grayscale-condition and/or the first area-condition when the format of the target image data is the same as the format of the preset template data.

3. The display device according to claim 1, wherein:
in terms of executing polarity adjustment on the signal transmission line of the display device when the target image data satisfies the first grayscale-condition and/or the first area-condition, the processor is configured to:
determine whether the first grayscale of the target image data is greater than or equal to the first preset grayscale and whether the second grayscale of the target image data is less than or equal to the second preset grayscale, wherein the first grayscale is greater than the second grayscale, and the first preset grayscale is greater than or equal to the second preset grayscale; and execute polarity adjustment on the signal transmission line of the display device when the first grayscale is greater than or equal to the first preset grayscale and the second grayscale is less than or equal to the second preset grayscale; or in terms of executing polarity adjustment on the signal transmission line of the display device when the target image data satisfies the first grayscale-condition and/or the first area-condition, the processor is configured to:
determine whether the ratio of the area of the repeat units in the target image data to the entire detection area is greater than or equal to the first preset ratio; and execute polarity adjustment on the signal transmission line of the display device when the ratio of the area of the repeat units in the target image data to the entire detection area is greater than or equal to the first preset ratio.

4. The display device according to claim 1, wherein in terms of executing polarity adjustment on the signal transmission line of the display device when the target image data satisfies the first grayscale-condition and/or the first area-condition, the processor is configured to:
determine whether the first grayscale of the target image data is greater than or equal to the first preset grayscale and whether the second grayscale of the target image data is less than or equal to the second preset grayscale, wherein the first grayscale is greater than the second grayscale, and the first preset grayscale is greater than or equal to the second preset grayscale;
determine whether the ratio of the area of the repeat units in the target image data to the entire detection area is greater than or equal to the first preset ratio when the first grayscale is greater than or equal to the first preset grayscale and the second grayscale is less than or equal to the second preset grayscale; and
execute polarity adjustment on the signal transmission line of the display device when the ratio of the area of the repeat units in the target image data to the entire detection area is greater than or equal to the first preset ratio.

5. The display device according to claim 1, wherein in terms of executing polarity adjustment on the signal transmission line of the display device, the processor is configured to:
output a first control signal, a second control signal, and a third control signal; and
change a potential of any one of the first control signal, the second control signal, or the third control signal, to make an abnormal parameter of the target image data subject to polarity adjustment is in a preset specification.

6. The display device according to claim 1, wherein
the processor is configured to after executing polarity adjustment on the signal transmission line of the display device:
determine whether an abnormal parameter of the target image data subject to polarity adjustment is in a preset specification; and when the abnormal parameter of the target image data subject to polarity adjustment is not in the preset specification, adjust at least one of a first preset grayscale, a second preset grayscale, a first adjustment value, and a second adjustment value in the second grayscale-condition, and re-execute polarity adjustment on the signal transmission line of the display device; or,
the processor is configured to after executing polarity adjustment on the signal transmission line of the display device:
determine whether an abnormal parameter of the target image data subject to polarity adjustment is in a preset specification; and when the abnormal parameter of the target image data subject to polarity adjustment is not in the preset specification, adjust at least one of a first preset ratio or a third adjustment value in the second area-condition, and re-execute polarity adjustment on the signal transmission line of the display device.

7. An image processing method for image processing on a display device, comprising:
receiving target image data;
performing picture detection on the target image data;
executing polarity adjustment on a signal transmission line of the display device when the target image data satisfies a first grayscale-condition and/or a first area-condition; and
exiting polarity adjustment when the target image data satisfies a second grayscale-condition or a second area-condition, wherein a condition range in which the second grayscale-condition is satisfied is less than a condition range in which the first grayscale-condition is not satisfied, and a range in which the second area-condition is satisfied is less than a range in which the first area-condition is not satisfied; wherein:
exiting polarity adjustment when the target image data satisfies the second grayscale-condition or the second area-condition comprises:
determining whether a first grayscale of the target image data is less than or equal to a third preset grayscale, and whether a second grayscale of the target image data is greater than or equal to a fourth preset grayscale, wherein the third preset grayscale is a difference between a first preset grayscale and a first adjustment value, and the fourth preset grayscale is a sum of a second preset grayscale and a second adjustment value; and
the first grayscale-condition comprises that the first grayscale is greater than or equal to the first preset grayscale, and the second grayscale is less than or equal to the second preset grayscale; and exiting polarity adjustment when the first grayscale of the target image data is less than or equal to the third preset grayscale, and the second grayscale of the target image data is greater than or equal to the fourth preset grayscale; or, exiting polarity adjustment when the target image data satisfies the second grayscale-condition or the second area-condition comprises:
determining whether a ratio of an area of repeat units in the target image data to an entire detection area is less than or equal to a second preset ratio, wherein the second preset ratio is a difference between a first preset ratio and a third adjustment value, and the first area-condition comprises whether the ratio of the area of the repeat units in the target image data to the entire detection area is greater than or equal to the first preset ratio; and exiting polarity adjustment when the ratio of the area of the repeat units in the target image data to the entire detection area is less than or equal to the second preset ratio.

8. The image processing method according to claim 7, wherein performing picture detection on the target image data comprises:
determining whether a format of the target image data is the same as a format of a preset template data; and
determining whether the target image data satisfies the first grayscale-condition and/or the first area-condition when the format of the target image data is the same as the format of the preset template data.

9. The image processing method according to claim 7, wherein:
executing polarity adjustment on the signal transmission line of the display device when the target image data satisfies the first grayscale-condition and/or the first area-condition comprising:
determining whether the first grayscale of the target image data is greater than or equal to the first preset grayscale and whether the second grayscale of the target image data is less than or equal to the second preset grayscale, wherein the first grayscale is greater than the second grayscale, and the first preset grayscale is greater than or equal to the second preset grayscale; and executing polarity adjustment on the signal transmission line of the display device when the first grayscale is greater than or equal to the first preset grayscale and the second grayscale is less than or equal to the second preset grayscale; or
executing polarity adjustment on the signal transmission line of the display device when the target image data satisfies the first grayscale-condition and/or the first area-condition comprises:
determining whether the ratio of the area of the repeat units in the target image data to the entire detection area is greater than or equal to the first preset ratio; and
executing polarity adjustment on the signal transmission line of the display device when the ratio of the area of the repeat units in the target image data to the entire detection area is greater than or equal to the first preset ratio.

10. The image processing method according to claim 7, wherein executing polarity adjustment on the signal transmission line of the display device when the target image data satisfies the first grayscale-condition and/or the first area-condition comprises:
determining whether the first grayscale of the target image data is greater than or equal to the first preset grayscale and whether the second grayscale of the target image data is less than or equal to the second preset grayscale, wherein the first grayscale is greater than the second grayscale, and the first preset grayscale is greater than or equal to the second preset grayscale;
determining whether the ratio of the area of the repeat units in the target image data to the entire detection area is greater than or equal to the first preset ratio when the first grayscale is greater than or equal to the first preset grayscale and the second grayscale is less than or equal to the second preset grayscale; and
executing polarity adjustment on the signal transmission line of the display device when the ratio of the area of the repeat units in the target image data to the entire detection area is greater than or equal to the first preset ratio.

11. The image processing method according to claim 7, wherein executing polarity adjustment on the signal transmission line of the display device comprises:
outputting a first control signal, a second control signal, and a third control signal; and
changing a potential of any one of the first control signal, the second control signal, or the third control signal, to make an abnormal parameter of the target image data subject to polarity adjustment is in a preset specification.

12. The image processing method according to claim 7, wherein
the method further comprises after executing polarity adjustment on the signal transmission line of the display device:

determining whether an abnormal parameter of the target image data subject to polarity adjustment is in a preset specification; and when the abnormal parameter of the target image data subject to polarity adjustment is not in the preset specification, adjusting at least one of a first preset grayscale, a second preset grayscale, a first adjustment value, and a second adjustment value in the second grayscale-condition, and re-executing polarity adjustment on the signal transmission line of the display device; or, the method further comprises after executing polarity adjustment on the signal transmission line of the display device:

determining whether an abnormal parameter of the target image data subject to polarity adjustment is in a preset specification; and when the abnormal parameter of the target image data subject to polarity adjustment is not in the preset specification, adjusting at least one of a first preset ratio or a third adjustment value in the second area-condition, and re-executing polarity adjustment on the signal transmission line of the display device.

13. A non-transitory computer-readable storage medium storing a computer program, wherein the computer program, when executed by a processor, is configured to:

receive target image data;

perform picture detection on the target image data;

execute polarity adjustment on a signal transmission line of the display device when the target image data satisfies a first grayscale-condition and/or a first area-condition; and exit polarity adjustment when the target image data satisfies a second grayscale-condition or a second area-condition, wherein a condition range in which the second grayscale-condition is satisfied is less than a condition range in which the first grayscale-condition is not satisfied, and a range in which the second area-condition is satisfied is less than a range in which the first area-condition is not satisfied; wherein:

in terms of exiting polarity adjustment when the target image data satisfies the second grayscale-condition or the second area-condition, the computer program, when executed by the processor, is configured to:

determine whether a first grayscale of the target image data is less than or equal to a third preset grayscale, and whether a second gray scale of the target image data is greater than or equal to a fourth preset grayscale, wherein the third preset grayscale is a difference between a first preset grayscale and a first adjustment value, and the fourth preset grayscale is a sum of a second preset grayscale and a second adjustment value; and the first grayscale-condition comprises that the first grayscale is greater than or equal to the first preset grayscale, and the second grayscale is less than or equal to the second preset grayscale; and exit polarity adjustment when the first grayscale of the target image data is less than or equal to the third preset grayscale, and the second grayscale of the target image data is greater than or equal to the fourth preset grayscale; or, in terms of exiting polarity adjustment when the target image data satisfies the second grayscale-condition or the second area-condition, the computer program, when executed by the processor, is configured to:

determine whether a ratio of an area of repeat units in the target image data to an entire detection area is less than or equal to a second preset ratio, wherein the second preset ratio is a difference between a first preset ratio and a third adjustment value, and the first area-condition comprises whether the ratio of the area of the repeat units in the target image data to the entire detection area is greater than or equal to the first preset ratio; and exit polarity adjustment when the ratio of the area of the repeat units in the target image data to the entire detection area is less than or equal to the second preset ratio.

14. The non-transitory computer-readable storage medium according to claim 13, wherein in terms of performing picture detection on the target image data, the computer program, when executed by the processor, is configured to:

determine whether a format of the target image data is the same as a format of a preset template data; and determine whether the target image data satisfies the first grayscale-condition and/or the first area-condition when the format of the target image data is the same as the format of the preset template data.

15. The non-transitory computer-readable storage medium according to claim 13, wherein:

in terms of executing polarity adjustment on the signal transmission line of the display device when the target image data satisfies the first grayscale-condition and/or the first area-condition, the computer program, when executed by the processor, is configured to:

determine whether the first grayscale of the target image data is greater than or equal to the first preset grayscale and whether the second grayscale of the target image data is less than or equal to the second preset grayscale, wherein the first grayscale is greater than the second grayscale, and the first preset grayscale is greater than or equal to the second preset grayscale; and execute polarity adjustment on the signal transmission line of the display device when the first grayscale is greater than or equal to the first preset grayscale and the second grayscale is less than or equal to the second preset grayscale; or in terms of executing polarity adjustment on the signal transmission line of the display device when the target image data satisfies the first grayscale-condition and/or the first area-condition, the computer program, when executed by the processor, is configured to:

determine whether the ratio of the area of the repeat units in the target image data to the entire detection area is greater than or equal to the first preset ratio; and execute polarity adjustment on the signal transmission line of the display device when the ratio of the area of the repeat units in the target image data to the entire detection area is greater than or equal to the first preset ratio.

16. The non-transitory computer-readable storage medium according to claim 13, wherein in terms of executing polarity adjustment on the signal transmission line of the display device when the target image data satisfies the first grayscale-condition and/or the first area-condition, the computer program, when executed by the processor, is configured to:

determine whether the first grayscale of the target image data is greater than or equal to the first preset grayscale and whether the second grayscale of the target image data is less than or equal to the second preset grayscale, wherein the first grayscale is greater than the second grayscale, and the first preset grayscale is greater than or equal to the second preset grayscale;

determine whether the ratio of the area of the repeat units in the target image data to the entire detection area is greater than or equal to the first preset ratio when the first grayscale is greater than or equal to the first preset grayscale and the second grayscale is less than or equal to the second preset grayscale; and execute polarity adjustment on the signal transmission line of the display device when the ratio of the area of the repeat units in the target image data to the entire detection area is greater than or equal to the first preset ratio.

17. The non-transitory computer-readable storage medium according to claim 13, wherein in terms of executing polarity adjustment on the signal transmission line of the display device, the computer program, when executed by the processor, is configured to:

output a first control signal, a second control signal, and a third control signal; and change a potential of any one of the first control signal, the second control signal, or the third control signal, to make an abnormal parameter of the target image data subject to polarity adjustment is in a preset specification.

18. The non-transitory computer-readable storage medium according to claim 13, wherein the computer program, when executed by the processor, is further configured to after executing polarity adjustment on the signal transmission line of the display device:

determine whether an abnormal parameter of the target image data subject to polarity adjustment is in a preset specification; and when the abnormal parameter of the target image data subject to polarity adjustment is not in the preset specification, adjust at least one of a first preset grayscale, a second preset grayscale, a first adjustment value, and a second adjustment value in the second grayscale-condition, and re-execute polarity adjustment on the signal transmission line of the display device; or, the computer program, when executed by the processor, is further configured to after executing polarity adjustment on the signal transmission line of the display device:

determine whether an abnormal parameter of the target image data subject to polarity adjustment is in a preset specification; and when the abnormal parameter of the target image data subject to polarity adjustment is not in the preset specification, adjust at least one of a first preset ratio or a third adjustment value in the second area-condition, and re-execute polarity adjustment on the signal transmission line of the display device.

* * * * *